July 16, 1957

N. W. SCOTT 2,799,600

METHOD OF PRODUCING ELECTRICALLY CONDUCTING
TRANSPARENT COATINGS ON OPTICAL SURFACES
Filed Aug. 17, 1954

INVENTOR.
NOEL W. SCOTT
BY
ATTYS.

2,799,600
Patented July 16, 1957

United States Patent Office

2,799,600
METHOD OF PRODUCING ELECTRICALLY CONDUCTING TRANSPARENT COATINGS ON OPTICAL SURFACES

Noel W. Scott, Indianapolis, Ind., assignor to the United States of America as represented by the Secretary of the Navy Application August 17, 1954, Serial No. 450,562

7 Claims. (Cl. 117—211)

(Granted under Title 35, U. S. Code (1952), sec. 266)

The invention described herein may be manufactured and used by or for the Government of the United States of America for governmental purposes without the payment of any royalties thereon or therefor.

This invention relates to the method of coating optical surfaces and more particularly to the method of producing an electrically conducting coating on optical surfaces which provides a low electrical resistance, a high percentage of light transmittance, and a stable surface against removal or scratch under normal conditions of use.

Considering the coating processes of known methods, in one known method the article having optical surfaces to be coated, as glass, has its temperature raised to a near softening point which usually destroys or damages the optical surfaces for its intended purpose. While the glass article is in this heated state, the surfaces are contacted with tin compound, or the like, producing an oxide of that metal. Although the coating is substantially stable the article has become useless for precision purposes because the optical surfaces have been damaged. Another method utilizing a high vacuum evaporation process requires the evaporation on glass surfaces of an oxide, or of a metal which is subsequently changed to its oxide by a glow discharge after it is deposited on the glass surface. An electrical conduction layer is then deposited on the oxide layer but good adhesion of the conducting layer by this method is hard to get.

Efforts to obtain stable conductive coatings have been many. It is well recognized that a conductive coating is best produced by one of the "noble" or "coinage" metals, as gold, silver, or copper, yet these metals are relatively chemically inactive and cannot be made to adhere directly to a siliceous material without heating the material to its softening point with the deleterious effects as pointed out above. When these noble metals are vacuum evaporated on a siliceous, or like surface, microscopic study shows that the metal collects in individual aggregates or "crystallites" with definite channels or cracks between them. To increase the coating thickness of noble metal to a point where the crystallites have grown together and the electrical resistance is low produces a coating too thick to transmit the desired percentage of light. It has been found that the conductive coating can best be applied to an optical surface by first applying a layer of a metal or metal alloy having a strong molecular attraction to the specimen material. Such adhesive metallic materials, as aluminum, chromium, titanium, "inconel," and the like, have a molecular attractive force for a siliceous, vitreous, or ceramic material substantially equaling that attractive force of the metallic material molecules for each other by which a very thin adhesive layer is formed that is smooth and continuous. Difficulty has been encountered in making the conductive layer or layers of a noble metal to adhere firmly to the adhesive layer. Although it is well known that a noble metal will adhere to other metals, and particularly where the layer is applied under heat, yet the instability of the conductive layer, by peeling or by being pulled off with adhesive tape, has been experienced. The adhesive metallic materials which form hard adherent oxides with optical surfaces, while electrically conductive in themselves, must be too thick when used alone to be of use as conductive coatings and they readily react with oxygen which destroys their conducting properties since a non-conducting oxide is formed.

In a study leading to the present invention it was determined that in former processes of depositing an adherent layer of evaporated metallic material and then a conductive layer of evaporated metal on an optical surface a lapse of time, although ever so short, was sufficient to permit an oxide of the adhesive layer of metallic material to form producing an "oxide barrier" onto which a subsequent conducting layer could not tenaciously hold. This short period of time was also sufficient to allow contamination of the adhesive layer to which layer another layer could not stably adhere. The method of this invention therefore contemplates a continuous evaporation process between all layers of different evaporated metallic materials or other materials to prevent the formation of any barriers, oxide or contamination, and to molecularly integrate the several layers. The method by which this is accomplished is by vacuum evaporation of the coating materials in continuous, consecutive order to the specimen such that actual contact of pure metallic materials is effected for molecular integration. This method, in practice, may produce an overlap layer or "transition alloy layer" between the principal material layers of a combination of the materials evaporated and, while unnecessary, is not harmful in any way. This "transition alloy layer," if any, may be and preferably is infinitesimally thin and actually approach or become zero. When the first layer is of a metal material as aluminum, cerium, chromium, titanium, or zirconium, or is of an alloy metallic material as "inconel," for examples of a group of metallic materials having good adhesive properties to siliceous, vitreous, and ceramic materials and which generally have low electrical conductance, and the second layer is one of the noble metals, as gold, silver or copper, the combination coating approaches the adhesion and smoothness qualities of the first metallic material and the electrical conducting qualities of the noble metal. This procedure produces a molecularly integrated coating which can be rendered more stable by heat treating the specimen. This heat treatment can be by applying the various layers while the specimen is held at a temperature below its softening point or by heat treating the specimen after the coating is applied. Thus a conductive coating is made to adhere tenaciously to siliceous, vitreous, or ceramic material surfaces through this method of providing actual contact of uncontaminated metallic material layers.

It has been found that a conductive coating applied by this method cannot be pulled off as by adhesive tape, or the like, that approximately 70 percent of visible light will be transmitted, and that an electrical resistance of less than 100 ohms per square area may be obtained. Since noble metals are inherently soft, a protective coating, applied in the same manner as the conductive coating, can be made to adhere over the noble metal coating. It is therefore a general object of this invention to provide a method for producing a stable electrical conductive coating on optical surfaces of material which has a high percentage of transmission of visible light and a low electrical resistance per square.

These and other objects, advantages, features, and uses will be more apparent as the description proceeds when considered in view of the accompanying drawing, in which.

Figure 1:
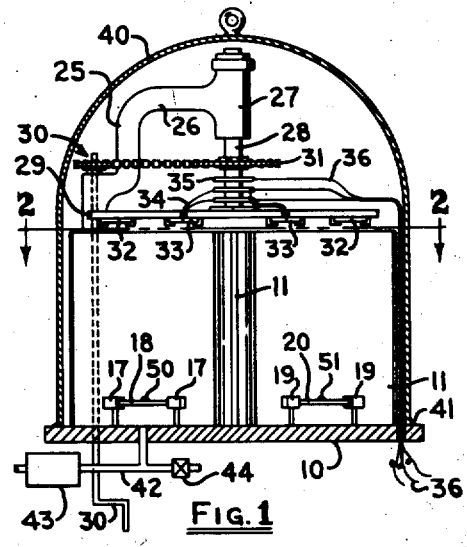
Fig. 1 is a longitudinal cross-sectional view of an illustrated structure for carrying out the coating method.
Figure 2:
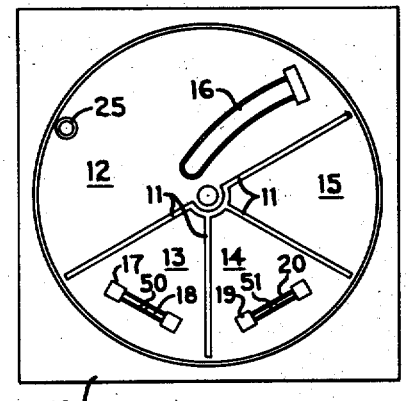
Fig. 2 is a cross-sectional view of the structure in Fig. 1 taken along the line 2—2 looking in the direction of the arrows.

Referring more particularly to Figs. 1 and 2, an apparatus is illustrated which may be used in applying electrical conductive coatings to optical surfaces of siliceous, vitreous, or ceramic materials. This apparatus may take the form for illustrative purposes, as shown in Figs. 1 and 2, of a base member 10 on which is fixed a plurality of division walls 11 to divide a circular area into compartments, four such compartments 12, 13, 14 and 15 being illustrated herein. In the compartment 12 is an elongated aluminum cathode 16 for ionic bombardment of the specimens. In the compartment 13 is a pair of heavy electrodes 17 of heavy copper, or the like, supporting a crucible 18 therebetween of tungsten, molybdenum, or the like. The electrodes are supported on the base 10 in any suitable manner by electrical insulators and conductors are coupled to the electrodes in a manner well understood in the art. A similar pair of electrodes 19 support a crucible 20 in the compartment 14. The compartment 15 contains no crucible.

Fixed to the base 10 within the area of compartment 12 is a post 25 which has a neck portion 26 that curves over the center of the base 10 and forms a journal 27 for a depending shaft 28. On the lower end of the shaft 28 is fixed a disc 29 the lower surface of which has a small clearance from the top edges of the partitions 11. The shaft 28 is made to rotate by any well known means herein shown as a hand crank 30 coupled through gearing, chain, and sprocket 31 to the shaft 28. Where desirable, the drive may be by utilizing a controllable electric motor. The lower surface of the disc 29 has means as angle brackets to support specimens to be coated as shown at 32. Samples illustrated at 33 are held against the undersurface of the disc 29 in the same manner. The samples 33 are made one inch square, for the purpose which will later become clear, and have electrodes coupled to opposite edges thereof and connected to slip rings 35 on the shaft 28. Brush conductors 36 conduct currents from a resistance meter (not shown) across the surface of the samples to indicate resistance readings of the coating on each sample. The conductors 36 extend through an opening in the base 10 through a plastic filler to prevent an air leak across the base 10, the reasons for which will soon become clear.

Over the above structure is a bell jar 40, preferably of transparent material that will not affect the coating process, which may be raised and lowered in any suitable and well known manner. The lower edge of the bell jar has a lip sealing strip 41, as of rubber or the like, which rests in the lowermost position against the top face of the base 10. The only opening through the base 10 is by a conduit 42 to a vacuum pump 43 for evacuating the volume under the bell jar 40. A valve 44 may be placed in a branch of the fluid conduit 42 to relieve the vacuum, when desired.

The mechanical operation of the apparatus illustrated in Figs. 1 and 2 will now be described in order that a better understanding of the method may be obtained when descriptive reference is made to Figs. 3 and 4. The specimens 32 and samples 33 to be coated are fixed to the underside of the disc 29. One specimen and sample is started in compartment 12 and the aluminum cathode 16 is energized to heat and to clean the specimen and sample surfaces. This heating and cleaning is carried out under a partial vacuum under the bell jar 40 so that cleaning may be accomplished by ion bombardment. The crank 30 is rotated to cause rotation of the disc in the rotative direction to carry the specimens and samples through the compartments 12, 13, 14 and 15 in that order. Disc 29 rotation, aluminum cathode 16 energization, and vacuum pump operation may be so timed that the specimen and sample are in proper condition for the first coating when they pass into compartment 13. The crucible 18 has the desirable metal 50 therein for forming an adherent coating and the crucible 20 has the metal for producing an electrical conductive coating. The electrodes for these crucibles are energized at the proper time to produce a full flow of evaporation the metals 50 and 51 when a specimen and a sample are passing through the respective compartment. The resistance of the conductive coating can be constantly checked for the specimen by a direct resistance reading of the sample 33. The specimen is coated with the two metallic materials consecutively with no contamination period between layers, as will later be more fully explained. The number of compartments may be increased to carry out other functions of applying additional layers, heat treating, etc., as desired, the apparatus forming no part of the invention and being shown only for the purpose of illustrating the means for carrying out the invention.

Figure 3:
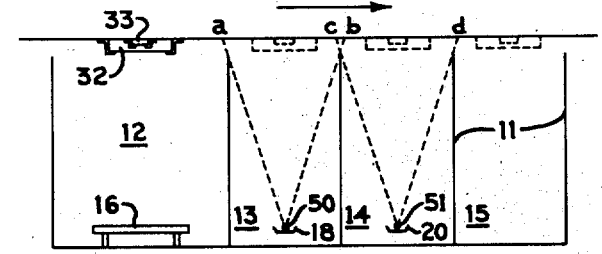
Fig. 3 illustrates diagrammatically the method steps of the coatings of this invention.
Figure 4:
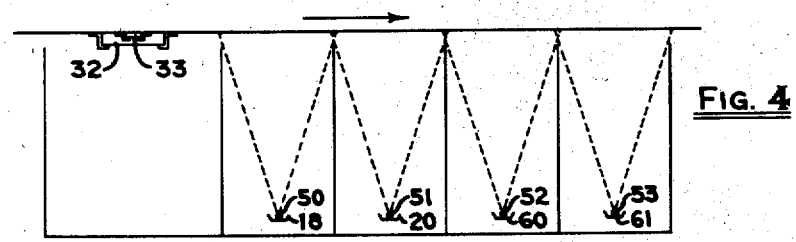
Fig. 4 illustrates diagrammatically a modification or addition of the method of Fig. 1 wherein a protective coating may be fixed over the conductive coating.

Referring now more particularly to Fig. 3, which is a diagrammatic illustration of the apparatus of Figs. 1 and 2, a siliceous specimen 32 and a siliceous sample 33, for the purpose of example, are passed over a cathode heater, as 16, which heats them to a temperature from approximately 100 degrees to 350 degrees centigrade. This heating step is carried out under a partial vacuum which at the same time cleans the surface of the specimen and sample as explained above. After the cleaning step, the pressure is dropped into the range preferably about $5 \times 10^{-5}$ millimeters of mercury or less. The partitions 11 just clear the lowermost edge of the specimen and sample and their retaining means and in actual practice this space may be large enough to allow a small overlap c—b in the cones of evaporation a—b and c—d. While this overlap c—b may result actually, this overlap is not necessary, it only being necessary that there be no gap in the cones of evaporation from the metals 50 and 51 in the crucibles 18 and 20. If such an overlap does actually occur, the overlapped evaporation would produce an exceedingly thin "transition alloy layer" which would have no harmful effects, the desired results of preventing any contamination layer to form between layers being accomplished. The crucible 18 has a metal or metal alloy of a group including aluminum, cerium, chromium, titanium, zirconium, "inconel," or the like, therein to evaporate a thin adhesive coating of a few molecules in thickness of this material on the specimen and sample, the metals chromium and titanium being preferred. The crucible 20 has a noble or coinage metal therein to evaporate an electrical conducting layer on the specimen and sample, gold being preferred. Other metals as platinum or rhodium may be used, if desired. In the transition period when the specimen and sample pass from compartment 13 to compartment 14 they pass from the evaporated metal 50 to the evaporated metal 51. The design of the apparatus should always be such that there is no gap for the specimen and sample between points b and c but where engineering tolerances permit the points b and c should be made to coincide. Any poor tolerance of machining should be in the direction of overlap c—b which would produce an infinitesimally thin "transition alloy layer." Since, by this method of coating, the metallic material 50 and 51 are absolutely contiguous in their pure forms, or are bonded through a "transition alloy layer," there is no possibility of the formation of a contamination layer or oxide layer of the first deposited metallic material and consequently a barrier, oxide or contamination, cannot be formed to prevent adhesion of the conductive layer. The adhesion layer bonds with the siliceous material with a molecular attractive force and the conductive layer bonds with the adhesive layer with a molecular attractive force providing a molecular integrated coating on the siliceous material. The conductive layer may be applied until the desired resistance reading is reached. A further means of taking light transmittance reading may be provided for as well, where desired.

Figure 5:
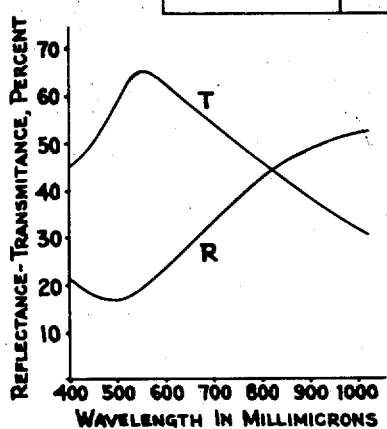
Fig. 5 is a graph plotting the general transmittance and reflectance curves of a coated optical specimen.

Such an electrical conductive coating may be made by putting aluminum and gold in the same crucible, but kept separated from one another, and vacuum evaporating them onto a siliceous specimen. Since aluminum will begin evaporation before gold, this natural phenomenon may be taken advantage of by utilizing an aluminum piece of a size to be exhausted shortly after the evaporation of gold begins so that continuous evaporation takes place and the intermediate coating layer is of aluminum and gold composition. The success of this method requires practice and skill on the part of the operator but very favorable coatings can be obtained. Fig. 5 illustrates a graph showing the transmittance and reflectance curves of a coating on glass produced in the above manner given as a function of wavelength from 400 millimicrons to 1 micron. The resistance of this coating was was 75 ohms per square. These curves are representative, however, of the coatings produced by all the methods of this invention. Such coatings are quite useful to protect optical elements from fog and ice by resistance heating, to act as an electrode on windows of barrier-layer or similar photo-cells, to conduct static charges from glass windows of sensitive instruments, and to reflect heat and transmit light while observing or photographing high temperature phenomena in furnaces and the like.

While the coating may be applied to the specimen at ambient temperature and a good bond accomplished, the molecular attractive force may be enhanced by heat treating the specimen sometime during or after the coating process. When the specimen is cleaned by ion bombardment its temperature may be raised at the same time into the range of 100 degrees to 350 degrees centigrade and maintained there until the coatings process is completed. The heat treatment may be carried out as well after the coating has been applied, or may be eliminated altogether.

It is well known that a metal of low bulk resistivity and relatively high visual transmission in thin layers, such as the noble metals as gold, silver, and copper, which may also include platinum and rhodium, are easily damaged by abrasion or the like. It is therefore within the further contemplation of this invention to place protective coatings over the conductive coatings. As more particularly illustrated in Fig. 4, additional compartments are necessary and the metals 50 and 51 to be evaporated are those as described above. For the purpose of example, let it be assumed that the adhesive metals 50 and 52 are titanium and the conductive metal 51 is gold. For the protective layer used for the material 53, silicon monoxide, thorium oxyfluoride, or magnesium fluoride has been found quite satisfactory. As seen in Fig. 4, the transition of the specimen 32 from one evaporated metal to the next is always continuous which prevents the formation of an objectionable "oxide barrier" or contamination layer. Thus a hard and stable protective coating can be deposited on an optically-surfaced material which is durable against wear and abrasion. The coating may be heat treated in the manner described herein above, where desirable.

This method is equally applicable to the production of semi-conductive, photoconductive, and like films or interlayers, and in modifying the electrical characteristics of these films or layers.

While preferred methods and processes have been disclosed herein in illustrating the invention and in giving examples, it is to be understood that many modifications and changes in techniques of carrying out the invention may be made without departing from the spirit and scope thereof and I desire to be limited only in the scope of the appended claims.

I claim:

1. A method of putting stable coatings of metals on siliceous, vitreous, and ceramic specimen materials comprising the steps of; first cleaning by ionic bombardment a specimen to be coated; next passing said specimen through a first existent atmosphere of evaporated metal whereby said evaporated metal is deposited onto the surface of said specimen, said evaporated metal having good adhesion properties to said specimen; and next passing said specimen from said first atmosphere directly into a separated second existent atmosphere of evaporated metal having good electrical conductive properties and providing a deposit of said evaporated metal over the metal first deposited on said specimen in uninterrupted succession thereby establishing a total coating thickness on said specimen equal to the sum of the thicknesses of the two deposited metals, the latter two depositing steps being conducted in a substantial vacuum without interruption of said substantial vacuum between said steps.

2. A method as set forth in claim 1 wherein said first existent atmosphere of evaporated metal is produced by evaporating one metallic material from the group including aluminum, cerium, chromium, titanium, zirconium, and "inconel," and said second existent atmosphere of evaporated metal is produced by evaporating one metallic material from the group including gold, silver, and copper.

3. A method as set forth in claim 1 wherein said specimen is heated during said depositing steps thereby increasing the stabilization of said deposited materials.

4. A method of coating siliceous, vitreous, and ceramic specimen materials comprising the steps of; first cleaning by ionic bombardment a specimen to be coated; next passing said specimen through a first existent atmosphere produced by evaporating one metallic material from a group including aluminum, cerium, chromium, titanium, zirconium, and "inconel," whereby said evaporated material is deposited on said specimen; next passing said specimen from said first existent atmosphere directly into a separated second existent atmosphere produced by evaporating one metallic material from a group including gold, silver, and copper, whereby said evaporated metal is deposited over the material first deposited on said specimen; and then passing said specimen directly into a third existent atmosphere produced by evaporating one material from the group including silicon-monoxide, thorium oxyfluoride, and magnesium fluoride; the latter three depositing steps being conducted in uninterrupted succession in a substantial vacuum without interruption of said substantial vacuum between said steps.

5. A method of coating siliceous, vitreous, and ceramic specimen materials comprising the steps of; first placing a specimen into a compartmented chamber; producing a partial vacuum in said chamber; cleaning by ionic bombardment a specimen to be coated; next producing a substantial vacuum in said chamber, next passing said cleaned specimen into one compartment of said chamber having an existent atmosphere produced by evaporating one metal from a group including aluminum, cerium, chromium, titanium, zirconium, and "inconel," whereby said evaporated metal is deposited onto said specimen; and next passing said specimen from said first compartment directly into another compartment having an existent atmosphere produced by evaporating one metal from a group including gold, silver, and copper, whereby said evaporated metal is deposited over said first deposited metal.

6. A method as set forth in claim 5 wherein said specimen is heated during said depositing steps thereby increasing the stabilization of said deposited materials.

7. A method as set forth in claim 5 wherein said specimen is passed from said second compartment directly into a third compartment having an existent atmosphere produced by evaporating one material from a group including silicon-monoxide, thorium oxyfluoride, and magnesium fluoride, thereby depositing a protective coating on the said specimen.

References Cited in the file of this patent

UNITED STATES PATENTS

| | | |
|---|---|---|
| 2,151,457 | Williams | Mar. 21, 1939 |
| 2,467,953 | Bancroft et al. | Apr. 19, 1949 |
| 2,586,752 | Weber et al. | Feb. 19, 1952 |
| 2,606,955 | Herrick | Aug. 12, 1952 |